Figure 1:
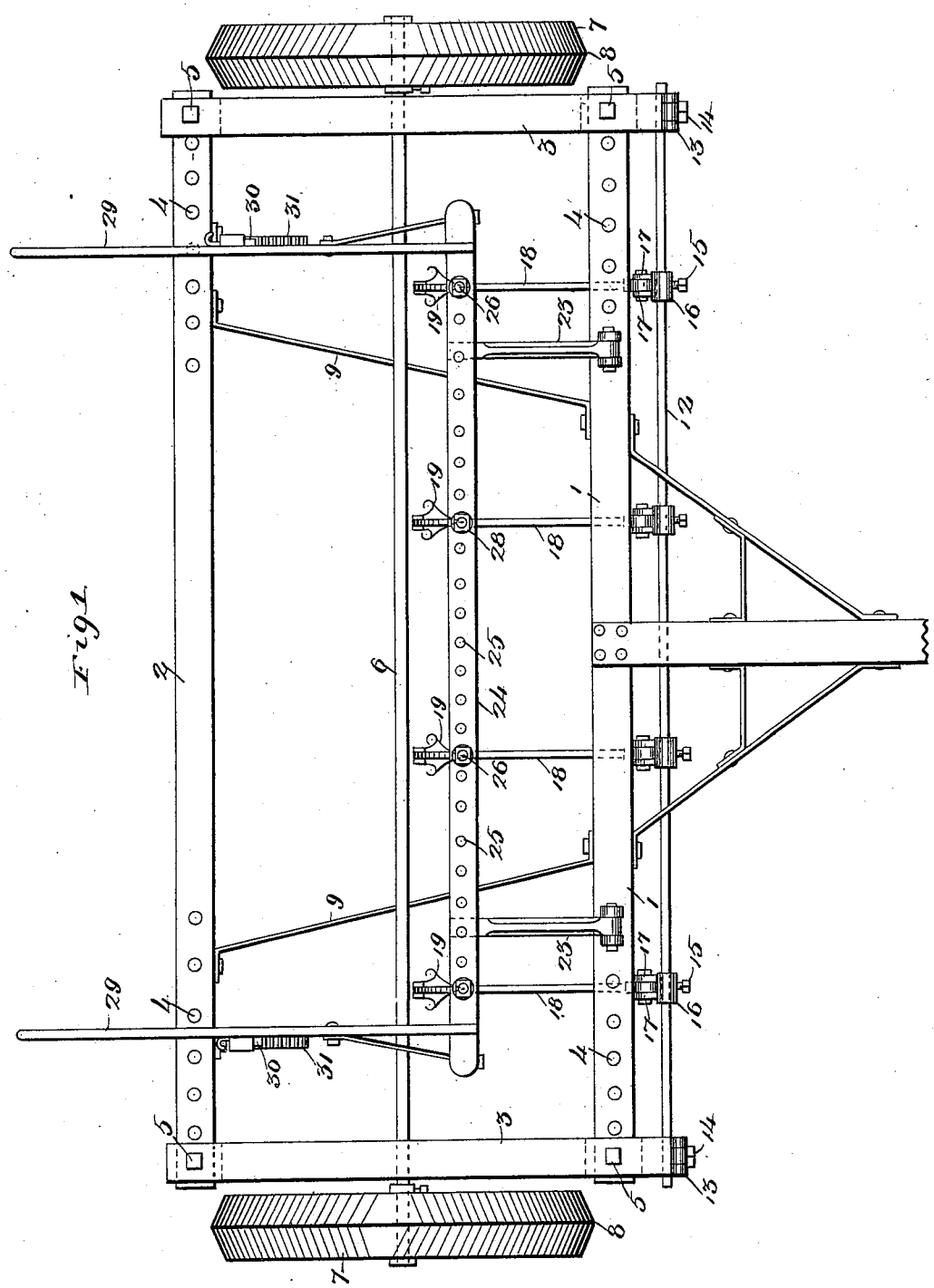

(No Model.)  2 Sheets—Sheet 1.

J. H. WINTER.
LAND MARKER.

No. 602,119.  Patented Apr. 12, 1898.

(No Model.) 2 Sheets—Sheet 2.
J. H. WINTER.
LAND MARKER.
No. 602,119. Patented Apr. 12, 1898.
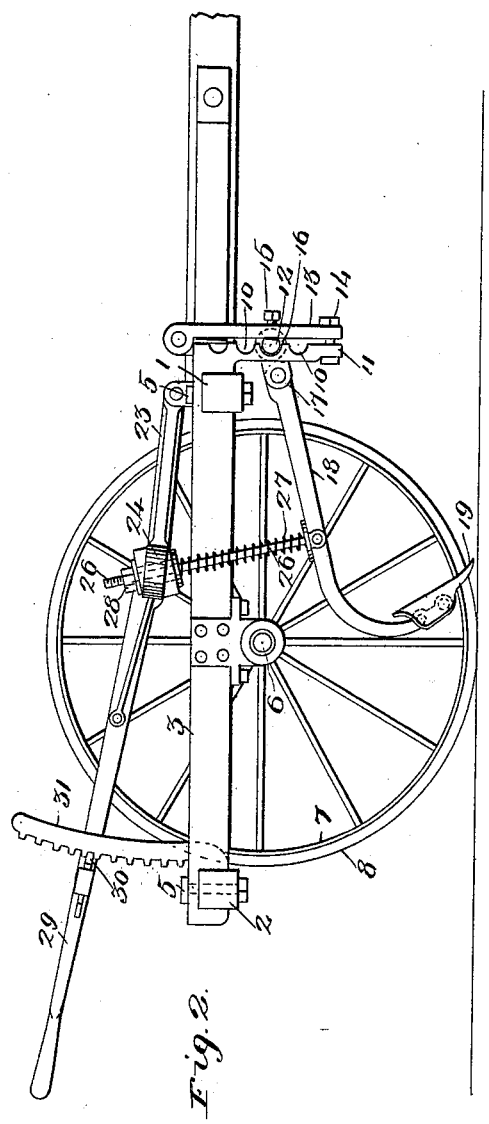
Fig. 2.
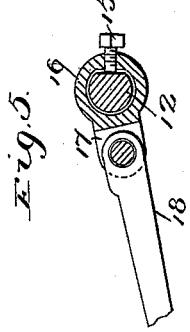
Fig. 5.
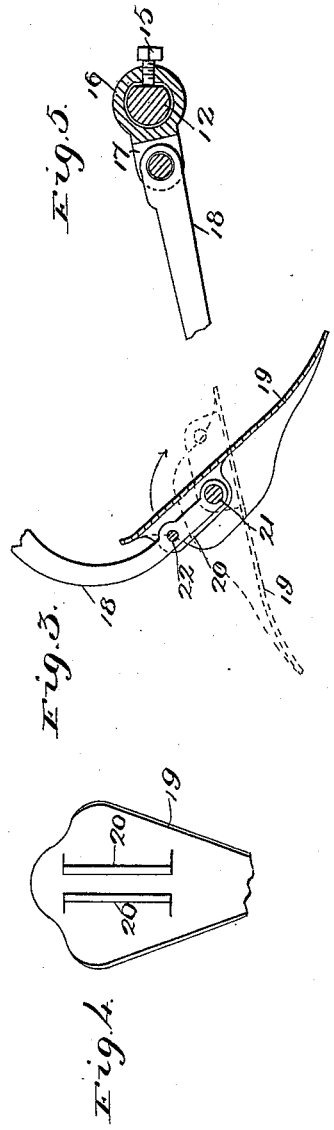
Fig. 3.
Fig. 4.
Witnesses
Alfred A. Mathey
Chris Balech
Inventor
John H. Winter.
By his Attorneys
Keller & Starek

UNITED STATES PATENT OFFICE.

JOHN H. WINTER, OF BROOKS, ILLINOIS.

LAND-MARKER.

SPECIFICATION forming part of Letters Patent No. 602,119, dated April 12, 1898.

Application filed June 30, 1897. Serial No. 642,985. (No model.)

*To all whom it may concern:*

Be it known that I, JOHN H. WINTER, a citizen of the United States, residing at Brooks, in the county of Madison and State of Illinois, have invented certain new and useful Improvements in Land-Markers, of which the following is a full, clear, and exact description, reference being had to the accompanying drawings, forming a part hereof.

My invention has relation to improvements in land-markers; and it consists in the novel arrangement and combination of parts more fully set forth in the specification and pointed out in the claims.

In the drawings, Figure 1 is a top plan view of my machine. Fig. 2 is a side elevation with one of the end wheels removed. Fig. 3 is a sectional detail of one of the shovels, showing the manner of securing the same to the arm by which it is supported. Fig. 4 is a view of the upper rear portion of the shovel, and Fig. 5 is a sectional detail showing the manner of fastening the arms carrying the shovels to the forward bar of the machine.

The object of my invention is to construct a land-marker—that is, a machine for furrowing the soil in paths or lines along which the seed is to be distributed during the sowing operation—a particular object being to construct a machine which will be simple and inexpensive, one in which the distances between the furrows are readily adjusted, one in which the depth of the furrow can be rendered constant or uniform, one which shall be light, and one possessing further and other advantages to be more particularly referred to in the detailed description of the invention, which is as follows:

Referring to the drawings, 1 and 2 represent, respectively, the front and rear longitudinal members of the frame of the machine, and 3 the side members. The free ends of the latter are made to embrace the members 1 2, the said members being provided with a series of openings 4, through any one of which and through the member 3 the securing-bolt 5 can be passed, thus varying the width or size of the frame according to requirements. The axle 6 is carried by the side members 3, the wheels 7 having a wide tread and provided with a medial peripheral ridge 8, adapted to form bevel tracks close to the frame and to the furrows made by the shovels of the machine, as will presently appear. The members 1 2 are reinforced by braces 9, the position of which may be shifted when occasion arises to distribute wheels along the axle within the frame.

Disposed along the front of the frame and vertically adjustable along suitable alining recesses 10, formed in the downwardly-deflected ends or arms 11 of the members 3, is a bar 12, adapted to be clamped and held within any recess by a pivoted clamping-arm 13, whose free end is made secure by a bolt 14 passing through the arm 11. The bar is substantially circular in cross-section, a portion of the periphery being flattened, the flattened portion presenting a bearing-surface for the inner ends of the bolts 15, by which the sliding rings 16, distributed along the length of the bar, are clamped to said bar. Each ring is provided with lugs or ears 17, between which is pivoted one end of an arm 18, having a rear curved end, the latter being secured to a shovel 19 between lugs 20, carried in the rear of the blades, the attachment being effected by two pins 21 22, the former being of metal and the latter of wood, whereby should the shovel encounter a serious obstruction the pin 21 would give way, permitting the shovel to tilt back (see dotted lines, Fig. 3) and ride freely over the said obstruction. I have here illustrated four shovels and four supporting-arms, although the number, of course, may be varied according to the desired distance between the furrows by simply loosening the bolts 15, shifting the rings along the bar 12 to any predetermined positions, adding such additional shovels as may be desired, and then tightly clamping the rings to the bar. It is obvious, of course, by reason of the sliding arrangement of the rings on the bar that the width between any two furrows can be altered at will.

The arms 18, to which the shovels are attached, extend rearwardly, so as to bring the shovels substantially under the axle of the machine, this arrangement serving to bring the entire weight or center of gravity of the machine directly over the shovels and insuring positive action on their part in the event the machine passes over hard obstructions.

Pivoted along the top of the member 1 on each side of the center thereof, are levers 23, to the free ends of which is secured the shovel-supporting bar 24, (made extensible, if necessary,) the latter being provided with a series of perforations 25, through which is adapted to loosely pass and project the upper end of a guide-lever 26, whose lower end is pivotally secured to the arm 18, a coiled spring 27, encircling the rod, being interposed between the arm 18 and the under surface of the bar 24, the effect of each spring being to positively force the point of the shovel against the soil passed over. A terminal nut 28 retains each "guide-rod" (so called because it guides the spring encircled about it) in place. Each end of the bar 24 has secured thereto an operating-lever 29, carrying a spring-actuated pawl 30, which rides over the teeth of a curved rack-bar 31, mounted on top of the member 2. By tilting the levers 29 to any position along the racks 31 the bar 24 will be correspondingly raised or lowered, and hence the degree of compression which the springs 27 exert against the shovels will be varied, this adjustment of course depending on the character of the soil passed over. As the bar 24 swings in the arc of a circle, the tendency would be, if depressed too low, to throw or tilt the points of the shovels unduly in an upward direction or from the ground, and in order to preserve the normal angle at which the shovels should be directed against the ground the operator may under the circumstances lower the position of the bar 12 to the proper supporting notches or recesses 10, designed to receive it. In this way the angle of the shear of the blades relatively to the surface of the ground passed over will be normally preserved.

For some kinds of vegetables, such as cabbage, simple grooves, such as made by the ridges of the wheels 7, are sufficient, in which event several such wheels may be distributed along the axle within the frame. For other kinds—such as corn, potatoes, &c.—shovels making actual furrows must be used. By reason of the adjustability prevailing among the several parts it is obvious that any width or number or depth of furrows is possible with the present device, which, by the way, may be altered in many details without departing from the spirit of my invention.

Having described my invention, what I claim is—

1. In a land-marker, a suitable frame, a bar carried by the frame at the forward end thereof, arms having pivotal ends connected to said bar, means for adjusting the bar in a vertical plane, shovels carried by the free ends of said arms and occupying a position substantially under the axle of the frame, and suitable springs for pressing the shovels against the ground, substantially as set forth.

2. In a land-marker, a suitable frame, a bar carried by the frame, arms having pivotal ends adapted to slide along said bar, means for adjusting said bar in a vertical plane, shovels carried by the free ends of said arms and occupying a position under the axle of the machine, and suitable springs for pressing the shovels against the ground, substantially as set forth.

3. In a land-marker, a suitable frame comprising front and rear members, side members adjustable along said front and rear members, a bar carried at the front end of the frame, rings slidingly mounted on said bar, arms pivoted to said rings, deflected arms having alining recesses or notches for receiving the opposite ends of the bar whereby the latter can be adjusted vertically, means for clamping said bar in position, levers pivoted along the front member, a bar carried by said levers, guide-rods extending from said last bar and connecting with the pivoted arms, springs encircling the guide-rods and interposed between the pivoted arms and the bar carried by the pivoted levers, shovels carried at the free ends of the pivoted arms, operating-levers for the shovel-carrying bar, a spring-actuated pawl carried by each lever, and a rack-bar for the pawls, the parts operating substantially as and for the purpose set forth.

In testimony whereof I affix my signature in presence of two witnesses.

JOHN H. WINTER.

Witnesses:
EMIL STARK,
ALFRED A. MATHEY.